(12) United States Patent
Isaac et al.

(10) Patent No.: US 8,364,140 B2
(45) Date of Patent: Jan. 29, 2013

(54) MEASURING RECEIVED SIGNAL QUALITY

(75) Inventors: Paul Isaac, Brunswick (AU); David Stanhope, Bayswater North (AU); Xinhua Wang, Glen Waverley (AU); Dobrica Vasic, Vermont South (AU)

(73) Assignee: NEC Corporation, Tokyo (JP)

( * ) Notice: Subject to any disclaimer, the term of this patent is extended or adjusted under 35 U.S.C. 154(b) by 1012 days.

(21) Appl. No.: 11/885,772

(22) PCT Filed: Mar. 8, 2006

(86) PCT No.: PCT/JP2006/305176
§ 371 (c)(1),
(2), (4) Date: Feb. 5, 2008

(87) PCT Pub. No.: WO2006/095913
PCT Pub. Date: Sep. 14, 2006

(65) Prior Publication Data
US 2009/0129357 A1    May 21, 2009

(30) Foreign Application Priority Data

Mar. 9, 2005   (AU) .............................. 2005901134
Jan. 6, 2006   (AU) .............................. 2006200038

(51) Int. Cl.
*H04W 24/00*   (2009.01)
(52) U.S. Cl. ...................................................... 455/423
(58) Field of Classification Search .................. 455/423, 455/127.1, 127.2
See application file for complete search history.

(56) References Cited

U.S. PATENT DOCUMENTS

| 6,542,558 B1 * | 4/2003 | Schulist et al. ............... 375/340 |
| 6,898,753 B2 * | 5/2005 | Bonifas ......................... 714/774 |
| 2002/0146984 A1 * | 10/2002 | Suenaga ...................... 455/67.1 |
| 2003/0107440 A1 * | 6/2003 | Miki et al. ..................... 330/297 |
| 2004/0198404 A1 * | 10/2004 | Attar et al. ..................... 455/522 |
| 2005/0288053 A1 * | 12/2005 | Gu ................................. 455/522 |
| 2006/0056356 A1 * | 3/2006 | Arvelo ........................... 370/332 |
| 2010/0016009 A1 * | 1/2010 | Andersson et al. ........... 455/522 |

FOREIGN PATENT DOCUMENTS

| JP | H08-163630 | 6/1996 |
| JP | 2001-197017 | 7/2001 |
| JP | 2005-006252 | 1/2005 |
| JP | 2005-057710 | 3/2005 |

OTHER PUBLICATIONS

Japanese Official Action dated Apr. 19, 2011 together with English language translation from related Japanese Patent Application No. 2007-541544.

* cited by examiner

*Primary Examiner* — Nathan Mitchell
(74) *Attorney, Agent, or Firm* — Scully, Scott, Murphy & Presser, P.C.

(57) ABSTRACT

A method of determining a signal quality parameter in a radio communications device includes: measuring a signal error parameter of a received signal (104); comparing said measured signal error parameter to a threshold level (106), and determining the signal quality parameter on the basis of a reference signal error parameter value (114) in the event that the measured signal error parameter value is less than the threshold level (112).

17 Claims, 3 Drawing Sheets

MEASURING RECEIVED SIGNAL QUALITY

TECHNICAL FIELD

In broad concept the present invention provides a method of determining a signal quality parameter in a radio communications device.

BACKGROUND ART

Although the illustrative embodiments will be described in connection with the measurement of signal quality of a downlink transmission in a wideband code division multiple access (WCDMA) cellular telecommunications network the methods described herein should not be considered limited to this type of transmission or network, but should be considered applicable to other devices and network types.

Overestimating Signal to Interference Ratio (SIR) and Signal to Noise Ratio (SNR) measurements can be a significant problem in some communications systems under certain conditions. Overestimation of these parameters can occur when the measured interference/noise power value underestimates the actual interference or noise power value. Improving the accuracy and reducing the variability of signal error and noise power values should reduce the inaccuracies in SIR and SNR measurements and consequently decrease variation in downlink power.

For example, in a WCDMA network, the dedicated physical channel (DPCH) interference signal code power (ISCP) measurements made by a user equipment typically exhibit a very high variation, which can lead to poor inner loop power control performance. The largest source of variation in the DPCH ISCP is usually sampling error, arising from the small number of pilot symbols available for each calculation. Additionally, since the DPCH pilot symbols take up a relatively small proportion of the slot, ISCP measurements based on the DPCH pilot symbols won't pick up interference that is distributed unevenly over the slot. Therefore, it is possible for the ISCP measurements to not reflect the ISCP of the data symbols, and for them to be biased.

In some conditions, biased ISCP measurements will cause the relationship between the measured SIR and block error rate (BLER) to change rapidly, or be significantly different to what it is in normal conditions. This can prevent outer loop power control from being able to control the BLER closely and achieve the desired BLER.

DISCLOSURE OF INVENTION

Accordingly, there is a need for a method of improving the determination of signal quality parameters in radio communication systems.

The present inventors have identified that by setting a minimum value for selected measured signal error parameters such as noise and/or interference much of the variation in and overestimation of the SIR, SNR or other signal quality parameters can be avoided.

In broad concept the present invention relates to a method of determining a signal quality parameter in a radio communications device wherein, in the event that a measured signal error parameter is below a threshold level, a reference signal error parameter value is used in place of the measured signal error parameter value in the determination of the signal quality parameter.

In a first aspect there is provided a method of determining a signal quality parameter in a radio communications device, said method including:

measuring a signal error parameter of a received signal; comparing said measured signal error parameter to a threshold level, and determining the signal quality parameter on the basis of a reference signal error parameter value in the event that the measured signal error parameter value is less than the threshold level.

In one embodiment, the method further includes, determining the reference signal error from at least one signal measurement. In an alternative embodiment the reference signal error value can be predetermined.

The predetermined threshold level can be an absolute or relative signal error parameter value. For example, the threshold value can be an absolute power level or a level proportional to the total power received.

In certain embodiments the method can include determining the threshold level on the basis of at least one signal measurement. For example, the threshold level can be determined on the basis of the measured power of another channel. Alternatively the threshold level can be predetermined.

In one embodiment the reference signal error parameter value can be selected from a predetermined value and a measurement-based value. In such an embodiment if a measurement-based value for the reference signal error parameter cannot be determined or the measurement-based value is lower than the predetermined value, the predetermined value is preferably used to determine the signal quality parameter. The method can additionally include:

determining a minimum signal expected error parameter value; and setting the threshold level to said minimum signal error parameter value.

In certain embodiments the reference signal error parameter value corresponds to the predetermined threshold level.

Preferably the method is used to determine the signal to interference ratio (SIR) or signal to noise ratio (SNR) of a received radio channel.

In a further aspect, the present invention provides a device adapted to determine a signal quality parameter of a received radio signal, said device including:

a measurement component configured to measure at least one signal error parameter of the received signal, comparison means configured to compare a measured signal error parameter to a corresponding threshold level, and memory means storing a set of instructions to control the operation of a data processing means; and data processing means, operating under control of said set of instructions, to determine the signal quality parameter of the received signal, wherein in the event that a measured signal error parameter value is less than a corresponding threshold level the data processing means is configured to determine the signal quality parameter of the received signal on the basis of a corresponding reference signal error parameter value.

The device can further include a reference signal determination component configured to determine the reference signal error parameter value.

The device can further include a threshold determination component configured to determine the reference signal error parameter value. The threshold determination component can be configured to determine the threshold level on the basis of at least one signal measurement. Alternatively the threshold level can be predetermined.

Any one or more of the comparison means, reference signal determination component or determination component can be implemented in hardware or software. In the event that one or more of the comparison means, reference signal determination component or determination component is implemented in software it is preferable that the software is stored as a set of instructions in said memory means for control of the processor means.

In further aspects the present invention also provides methods of power or gain control which use signal quality parameters determined according to the first aspect of the invention.

BRIEF DESCRIPTION OF DRAWINGS

Illustrative embodiments of the present invention will now be described, by way of non-limiting example only, with reference to the accompanying drawings, in which.

BEST MODE FOR CARRYING OUT THE INVENTION

Figure 1:
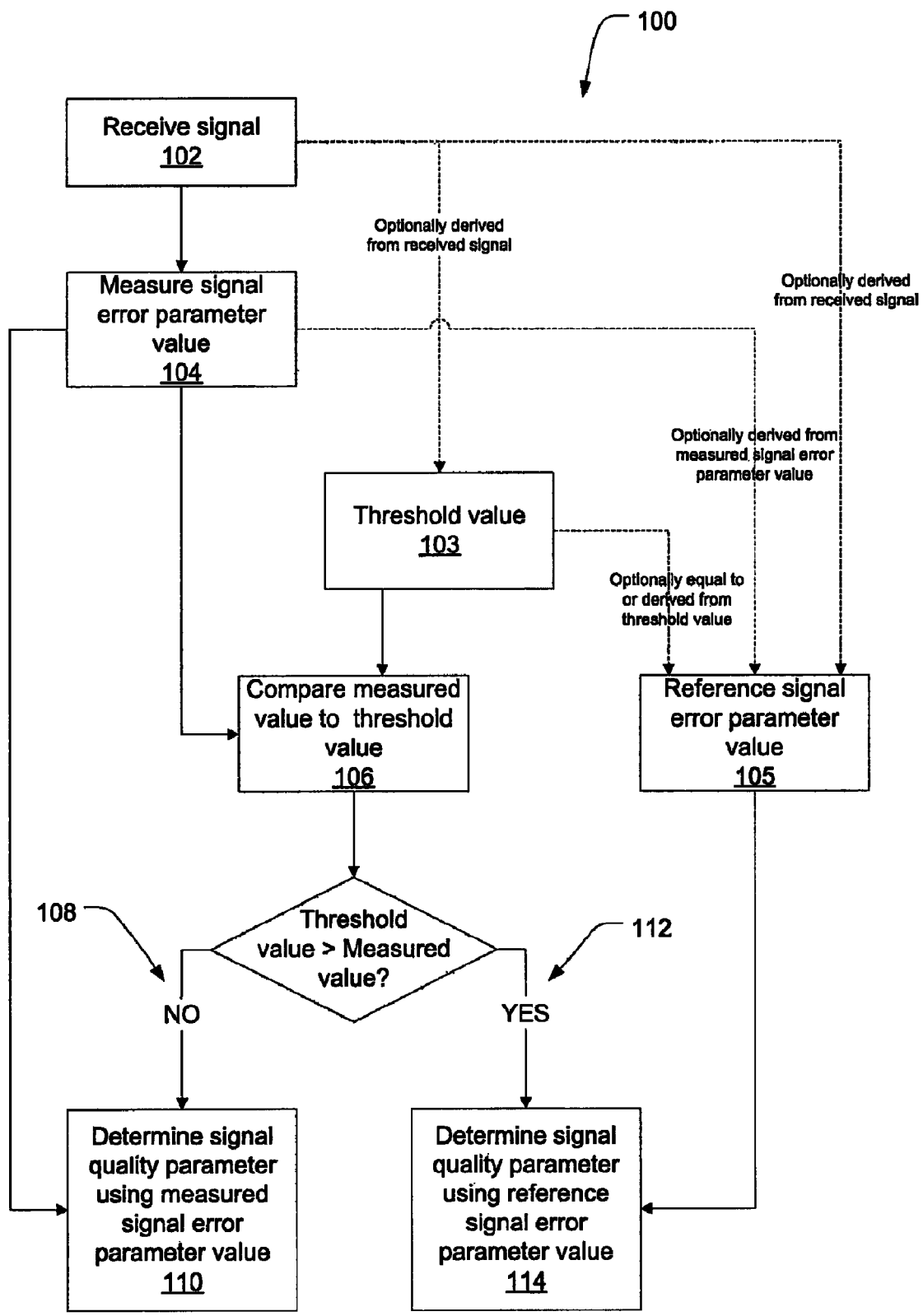
FIG. 1 is a flowchart depicting a process for determining a signal quality parameter for a received radio signal according to a first embodiment of the present invention.

Turning firstly to FIG. 1. In this example, a method is described for determining a signal quality parameter for a received radio transmission. The method 100 begins with the receiver device, e.g. a user equipment in a cellular telecommunications network, receiving a radio signal in the downlink direction in step 102. Next, in 104, a signal error parameter of the received signal is measured. This measured signal error parameter is compared to a threshold value 103 in step 106.

The outcome of the comparison of step 106 is used to determine what parameter value is to be used in subsequent steps of the method 100 to calculate the signal quality parameter of interest. In the event (step 108) that the measured signal parameter value is not less than the threshold value 103, the signal quality parameter of interest is calculated using the signal error parameter value measured in step 104. On the other hand, in the event (step 112) that the measured signal parameter value is less than the threshold value 103, then a reference signal error parameter value 105 is used in place of the measured signal error parameter value in the determination of the signal quality parameter in step 114.

The threshold value 103 and the reference signal error parameter value 105 can be determined in a variety of ways and can be viewed as representing either a minimum or desired value for the signal error parameter.

In a digital or analogue system there is always some minimum level of noise or interference. Measurements of the received signal quality can be used to determine this level. This noise level can be an absolute power level, or it can be proportional to the total received power. The noise level can be related to the power of another channel in the system, or it can be related to another variable or measurable quantity in the system. The minimum noise level in a system and any relationship with other measured values can be found empirically. Thus, in certain embodiments the threshold value 103 and/or the reference signal error parameter value 105 will be measured or calculated from one or more measured values. In such an embodiment the threshold value 103 and/or the reference signal error parameter value 105 will change depending on surrounding circumstances. For example threshold value 103 and the reference signal error parameter value 105 may be determined on the basis of a measurement conducted on a different channel from the one on which the signal parameter value is measured in step 104.

It may be difficult to determine the minimum interference level in all conditions. Accordingly, it is not necessary to base the threshold interference level 103 or reference signal error parameter value 105 on observed receiver noise and channel interference. The threshold value 103 and/or the reference signal error parameter value 105 could be predefined. In such an embodiment the threshold value 103 and/or the reference signal error parameter value 105 can be predefined in such a manner to account for the characteristics of the radio signal being monitored, for example the threshold value 103 and/or the reference signal error parameter value 105 can be determined on the basis of the type of channel being monitored, the type of receiver or transmitter etc.

Figure 2:
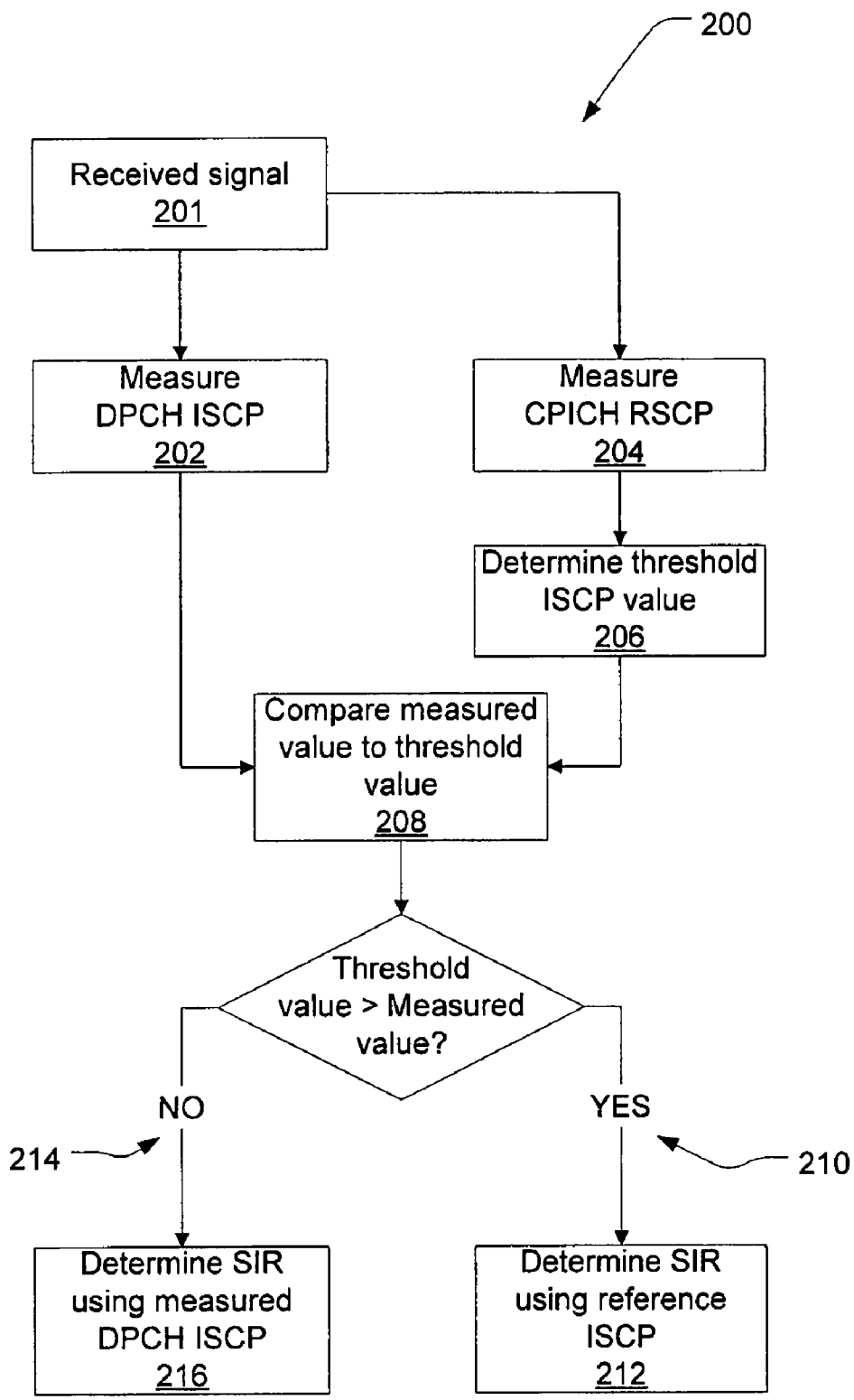
FIG. 2 is a flowchart depicting a process for determining the SIR for a received downlink transmission in a WCDMA network according to an embodiment of the present invention.

As will be appreciated, the threshold value 103 could be equal to the reference signal error parameter value 105. FIG. 2 shows a more detailed example of an embodiment of the present invention. This example relates to a process 200 implemented in a handset of a 3GPP WCDMA telecommunications system, to measure the signal to interference ratio (SIR) in the downlink direction.

The SIR of the received signal is calculated as the measured signal power, typically termed the received signal code power (RSCP), divided by the measured interference power, typically termed the interference signal code power (ISCP). In such a system, the dedicated physical channel (DPCH) pilot symbols can be used to measure the signal to interference ratio (SIR).

Other methods are known to exist for measuring the SIR such as measuring the RSCP on the DPCH, and the ISCP on the Common Pilot Channel (CPICH) with compensation for the difference of spreading factor gain between the DPCH and the CPICH.

In the first step 202 of the method 200 the DPCH ISCP is measured by the handset from the received signal 201. As with all systems, there are sources of noise and interference that will always be present, for example, in the present case quantisation error of the Analogue to Digital Converter (ADC) will always exist. When the DPCH RSCP is small compared to the total received power level, the quantisation noise becomes more significant, depending on the implementation of the receiver.

Since a large component of the DPCH ISCP is interference from other channels in the active set, the CPICH RSCP combined across the active set can be used to estimate the minimum level of interference from all other channels to DPCH. Thus the CPICH RSCP, which is measured at 204, can be used to determine a minimum possible interference level that can be used as a threshold value for the DPCH ISCP at 206.

Next, in 208, the ISCP measured directly from the DPCH pilot symbols is compared to the threshold ISCP value determined in 206. In the event, 210, that the measured DPCH ISCP is less than the minimum level of interference expected from other channels, represented by the threshold ISCP value determined in 206, a reference ISCP value can be used in place of the DPCH ISCP to determine the SIR in step 212. The reference ISCP value may or may not be the same as the threshold ISCP value.

The reference ISCP value can be determined in a number of ways. For instance, it may be known that the measured ISCP can never be more than X dB below the CPICH RSCP, the total downlink signal power (Received Signal Strength Indicator—RSSI), or some other value. This implies that a minimum possible ISCP (Minimum ISCP) can be determined.

The value for X can be determined empirically to match the observed interference, or to achieve the desired SIR measurements.

If desired, one of the following two equations can be used to set the reference ISCP:

Reference ISCP=Minimum ISCP(dB)=CPICH RSCP (dB)−X(dB).

Reference ISCP=Minimum ISCP(dB)=RSSI(dB)−X (dB)

Other similar equations or a combination of these equations may also be used in alternative embodiments. In each case above the Reference ISCP is set to be equal to the Minimum ISCP. However this may not always be desirable.

For example, one of the following two equations (or other similar equation) may be used to set the reference ISCP:

Reference ISCP=MAX(Minimum ISCP,DPCH ISCP)    (1)

Reference ISCP=Minimum ISCP+DPCH ISCP(linear addition)    (2)

Referring to FIG. 2, in the event 214 that the DPCH ISCP is greater than the threshold ISCP (which is equal to the reference ISCP in this example) the SIR is determined on the basis of the measured DPCH ISCP in step 216.

A situation where signal to interference ratio (SIR) measurements are improved by implementing an embodiment of the present invention will now be described. In the following situation the relationship between the measured SIR and the block error rate (BLER) may also be stabilised by applying an embodiment of the present invention. In this example a minimum ISCP is used in SIR measurements in cases where the measured ISCP is below a predetermined threshold.

The present example relates to a downlink transmission in a WCDMA network in conditions where the downlink signal is dominated by one cell with few users. In such a situation the total received power can change significantly within each 256-chip period because the channelisation codes of the channels combine constructively and destructively at different times. An example of this is the common pilot channel (CPICH) and the Primary Common Control Physical Channel (PCCPCH), which with channelisation codes 0 and 1, combine either constructively or destructively for all of the first 128 chips of each 256-chip period, and combine the opposite way for all of the second 128 chips. For higher downlink symbol rates (slot formats 13, 14, 15 and 16) the dedicated physical channel (DPCH) pilot symbols will fall within the last 128 chips of each slot. Therefore, when a single cell dominates the downlink signal and a high downlink symbol rate is used, the ISCP measured from the DPCH pilot symbols may not represent the ISCP over the entire slot. Rather it is only representative of the ISCP for the second half of each CPICH symbol period of 256 chips.

When the CPICH and PCCPCH combine destructively it may be found that the measured ISCP is extremely low, because the DPCH is a larger proportion of the total downlink signal power. This will cause overestimation of the SIR.

The data transmitted on PCCPCH determines whether the CPICH and PCCPCH combine constructively or destructively for the second 128 chips of each 256-chip period, whereas the "data" transmitted on the CPICH is always fixed. Therefore, the measured SIR may vary greatly from one slot to the next, causing the relationship between the measured SIR and the BLER to change significantly. The variation of SIR measurements will cause inner loop power control to make undesirable variations of the DPCH downlink power and prevent outer loop power control from being able to achieve the desired BLER.

By applying a threshold ISCP value and using a reference ISCP that represents the minimum allowable ISCP when the measured DPCH ISCP drops below the threshold value, the SIR measurements can effectively be smoothed out and the problems with inner loop and outer loop power control ameliorated.

Figure 3:
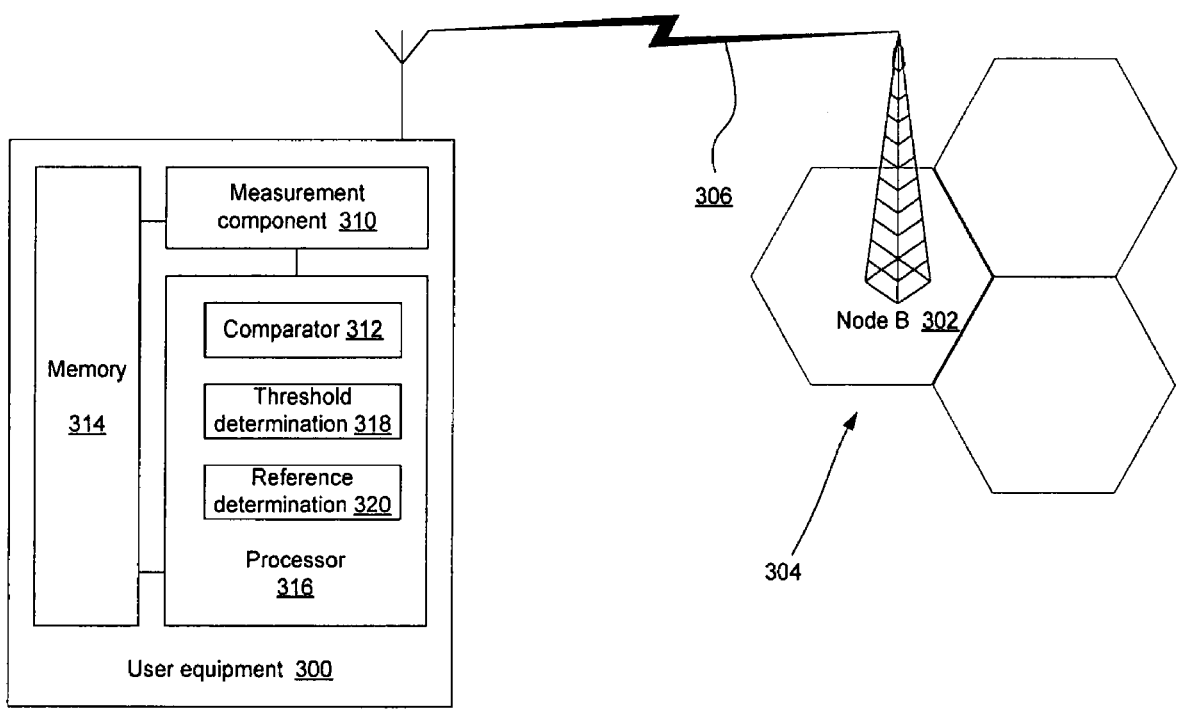
FIG. 3 depicts a user equipment of a wireless telecommunications network according to an embodiment of the present invention.

Embodiments of the present invention can be embodied in a user equipment of a cellular radio telecommunications network such as that shown in FIG. 3.

FIG. 3 depicts a user equipment 300, communication with a base station 302 of a cellular radio telecommunications network 304. In addition to, or integrated with the conventional hardware components, the user equipment 300 includes the following hardware and software components to enable it to determine a signal quality parameter of a received radio signal 306:

Measurement component 310, configured to measure at least one signal error parameter of the received signal, such as the DPCH ISCP and DPCH RSCP Comparison means 312, configured to compare a measured signal error parameter to a corresponding threshold level, e.g. the comparator can be configured to compare the DPCH ISCP to a threshold ISCP value determined as described above. Memory means 314, which are configured to store a set of instructions to control the operation of a data processing means 316. The memory means may be a single memory module or multiple memories. The memory can comprise both RAM and ROM as well as other forms of permanent or re-writable data storage means. In use the memory means 314 stores programs that enable the user equipment to operate and also store operating and parameter data.

Data processing means 316 which operate under control of the programs stored on the memory means 314 to implement a method in accordance with the embodiments described above. The processor means may comprise a plurality of processors or be a single processing device. The processing means 316 is configured to, inter alia, calculate from the available data one or more signal quality parameter values relating to the received signal. In accordance with the method set out above, In use, when the signal error parameter value measured by the measurement component, is less than the corresponding threshold level (as determined by the comparator 312) the data processing means 316 is programmed to use a corresponding reference signal error parameter value, instead of the measured value, to determine the signal quality parameter of the received signal.

The user equipment 300 can also include a threshold determination component 318 which sets the threshold level for one or more signal error parameters of the received signal. This determination can be based on signal measurements made by the measurement component 310 (or other measurement hardware in the user equipment 300).

In certain embodiments the user equipment 300 will also include a reference level determination component 320 which sets the reference level for one or more signal error parameters to be used in place of the measured value in the event that the measured parameter value falls below the threshold level. The reference level can be determined based on signal measurements made by the measurement component 310 (or other measurement hardware in the user equipment 300).

As will be appreciated by those skilled in the art the comparator 312, the threshold determination component 318 and reference determination component 320 can be implemented in software in the processor. Alternatively they could comprise standalone hardware components.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A method of determining a signal quality parameter in a radio communications device, the method comprising:
    measuring by a measurement component a signal error parameter of a received signal;
    comparing by comparison means the measured signal error parameter to a threshold level, and
    determining by data processing means the signal quality parameter on the basis of the measured signal error parameter in the event that the measured signal error parameter is equal to or more than the threshold level, and determining the signal quality parameter on the basis of a reference signal error parameter different from the threshold level in the event that the measured signal error parameter is less than the threshold level.

2. The method as claimed in claim 1, further comprising determining by a reference signal determination component the reference signal error parameter on the basis of at least one signal measurement.

3. The method as claimed in claim 1, further comprising determining by a threshold determination component the threshold level on the basis of at least one signal measurement.

4. The method as claimed in claim 1, wherein the threshold level is more than the reference signal error parameter.

5. The method as claimed in claim 1, wherein the threshold level is less than the reference signal error parameter.

6. The method as claimed in claim 2, further comprising:
    determining a minimum signal expected error parameter; and
    setting the threshold level to the minimum signal error parameter.

7. The method as claimed in claim 3, wherein the threshold level is determined on the basis of the measured power of another channel.

8. The method as claimed in claim 1, wherein the method is used to determine at least one of a signal to interference ratio (SIR), and a signal to noise ratio (SNR), of a received radio channel.

9. A method of power control in a radio telecommunication device comprising:
    determining a signal quality parameter in accordance with claim 1; and
    performing power control in the radio telecommunication device at least partly on the basis of the determined signal quality parameter.

10. A method of gain control in a radio telecommunication device comprising:
    determining a signal quality parameter in accordance with claim 1; and
    controlling gain in the radio telecommunication device at least partly on the basis of the determined signal quality parameter.

11. A device adapted to determine a signal quality parameter of a received radio signal, the device comprising:
    a measurement component configured to measure a signal error parameter of a received signal;
    comparison means configured to compare the measured signal error parameter to a threshold level;
    memory means storing a first set of instructions to control the operation of a data processing means; and
    data processing means, operating under control of the first set of instructions, configured to determine the signal quality parameter on the basis of the measured signal error parameter in the event that the measured signal error parameter is equal to or more than the threshold level, and to determine the signal quality parameter on the basis of a reference signal error parameter different from the threshold level in the event that the measured signal error parameter is less than the threshold level.

12. The device as claimed in claim 11, further comprising a reference signal determination component configured to determine the reference signal error parameter on the basis of at least one signal measurement.

13. The device as claimed in claim 11, further comprising a threshold determination component configured to determine the threshold level on the basis of at least one signal measurement.

14. The device as claimed in claim 11, wherein the threshold level is more than the reference signal error parameter.

15. The device as claimed in claim 11, wherein the threshold level is less than the reference signal error parameter.

16. The device as claimed in claim 11, wherein the comparison means is implemented as a software component.

17. The device as claimed in claims 16, wherein the software component is stored as a second set of instructions in the memory means for control of the comparison means.

* * * * *